United States Patent Office 2,788,358
Patented Apr. 9, 1957

2,788,358

CYCLOPENTENE AND CYCLOHEXENE PHOSPHATE AND THIOPHOSPHATE ESTERS

Christoph J. Grundmann and Rudi F. W. Rätz, Columbus, Ohio, assignors to Olin Mathieson Chemical Corporation, a corporation of Virginia No Drawing. Application July 20, 1955,
Serial No. 523,347

4 Claims. (Cl. 260—461)

This invention relates to novel phosphoric acid esters and their use as insecticides. More particularly, the novel phosphoric acid esters have the general formula:

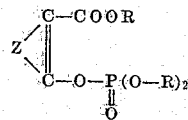

where X is oxygen or sulfur, the R's are alkyl groups which have from 1 to 5 carbon atoms and which can be the same or different and Z is trimethylene or tetramethylene. An example in which Z is the trimethylene group is the carbethoxycyclopentenyl diethyl phosphate of Example I. An example in which Z is the tetramethylene group is the 1-carbethoxycyclohexene-1-yl-2-diethylphosphate of Example IV.

The products of the present invention are generally prepared by the reaction in a suitable inert solvent, for example, benzene or ether, of a dialkyl halophosphate and the alkali metal, usually sodium, salt of the enol form of a ketoester. The precipitated alkali metal halide is removed and the ester recovered by distillation of the solvent. The residual products are generally light yellow oils, usually not distillable without decomposition even in high vacuum.

In use as insecticides, the novel esters are suitably formulated as dusts, wettable powders or emulsifiable concentrates. Siliceous clays in finely divided form are suitable diluents for dusts. An example of such an insecticidal dust is an intimate mixture of 5 weight percent of the product of Example III uniformly dispersed on 95 weight percent of attapulgite.

A 50 percent wettable powder can be prepared having the following composition:

| Component: | Percent by weight |
|---|---|
| Product of Example I | 50 |
| "Attaclay" | 40 |
| "MXP" (a proprietary mixture being about ½ diatomaceous earth and ½ polyoxyethylated tall oil) | 5 |
| Glue (Armour Sticker) | 5 |
| | 100 |

An example of an emulsifiable concentrate is a solution of 10 weight percent of the product of Example IV, 85 weight percent of xylene and 5 weight percent of a polyoxyethylated alkylphenol such as 12-polyoxyethylene para-nonylphenol or para-dodecylphenol.

The superior contact and systemic insecticidal properties of these compounds, as well as their preparation, are illustrated in the following examples. These examples are not in any way limiting.

EXAMPLE I

Carbethoxycyclopentenyl diethyl phosphate

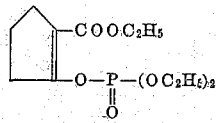

Diethylchlorophosphate (47.5 grams) was added dropwise with stirring to a suspension, maintained at 70° C., of 49.1 grams of the dried sodium salt of the enol form of carbethoxycyclopentanone in 400 milliliters of dry benzene. After refluxing, for three hours, the sodium chloride was dissolved by the addition of 30 milliliters of water and the aqueous layer was separated. The benzene solution remaining was washed three times with 2.0 milliliters of a 10 percent sodium chloride solution and once with 10 milliliters of saturated sodium bicarbonate solution. After drying the solution over sodium sulfate, the benzene was vacuum distilled. A residue of 75 grams (89 percent of theory) of carbethoxycyclopentenyl diethyl phosphate was obtained as a light yellow oil.

|  | P, percent |
|---|---|
| Calculated for $C_{12}H_{21}O_6P$ | 10.61 |
| Found | 10.28 |

Carbethoxycyclopentenyl diethyl phosphate was tested comparatively with the known insecticide alpha-methyl-betacarbethoxyvinyl diethyl phosphate as a contact insecticide on pea aphids (*Macrosiphum pisi* Kltb.), cotton aphids (*Aphis gossypii* Glov.), and Mexican bean beetles (*Epilachna varivestis* Muls.) and as a systemic insecticide on pea aphids (*Macrosiphum pisi* Kltb.).

The contact test against pea aphids and cotton aphids was conducted by the following method:

Broad bean plants (*Vicia fabae*) were dipped in a diluted 25 percent emulsifiable concentrate of the insecticide. After the water evaporated, the leaves were placed in plastic cups. Twenty (six-day old) aphids were placed on the leaves and the percent killed was observed after 48 hours.

The contact test against the Mexican bean beetle was conducted by the following method:

Bean leaves were sprayed for 45 seconds with 90 cc. of diluted 25 percent emulsifiable concentrate at 40 p. s. i. After the water evaporated, 10 late second or early third instar larvae were placed on the plant and confined with screened cages. Data were recorded after 48 hours on the percent mortality.

The results of these tests are shown in the following table in which the figures are percent kills:

| Compound | Pea Aphid | Cotton Aphid | Mexican Bean Beetle |
|---|---|---|---|
| Carbethoxycyclopentenyl diethyl phosphate: | | | |
| 25 p. p. m | 100 | 100 | |
| 500 p. p. m | | | 100 |
| Alpha-methyl-beta-carbethoxy-vinyl diethyl phosphate: | | | |
| 100 p. p. m | 0 | 0 | |
| 500 p. p. m | | | 0 |

These data show excellent (100 percent) control by the novel compound carbethoxycyclopentenyl diethyl phosphate in all of the above-described tests. Alpha-methyl-beta-carbethoxy-vinyl diethyl phosphate, however, failed to provide any lethal control of these insects.

The systemic test against the pea aphids was conducted by the following method:

The cut stems of broad bean plants are immersed in the diluted formulation. The (six day old) pea aphids are placed on the plants and confined by 16 mesh screen cages. Data are taken 48 hours later on the percent mortality. The compounds carbethoxycyclopentenyl diethyl phosphate and alpha-methyl-beta-carbethoxy-vinyl diethyl phosphate were both diluted to 50 p. p. m. Alpha-methyl-beta-carbethoxy-vinyl diethyl phosphate showed 54 percent mortality of the pea aphids, while carbethoxycyclopentenyl diethyl phosphate killed 100 percent of these insects. These data show that carbethoxycyclopentenyl diethyl phosphate is almost twice as effective as the known insecticide alpha-methyl-beta-carbethoxyvinyl diethyl phosphate.

EXAMPLE II

*Carbethoxycyclopentenyl diethyl phosphate*

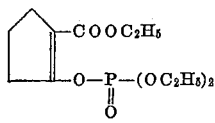

Diethylchlorophosphate (2.91 grams) was added to a suspension of 3 grams of the dried sodium salt of cyclopentanone alpha-carbethoxylate in 70 milliliters of anhydrous benzene. The mixture was refluxed for two hours. The precipitated sodium chloride was filtered off and the solvent was vacuum distilled. An ether solution of the oil residue was washed with concentrated sodium bicarbonate solution, dried over sodium sulfate, and the ether was then evaporated. The residue of carbethoxycyclopentenyl diethyl phosphate amounted to 4.1 grams (80 percent of the theory) of a light yellow oil, not distillable even in high vacuum.

P, percent
Calculated for $C_{12}H_{21}O_6P$ _____ 10.61
Found _____ 10.20

EXAMPLE III

*1-carbethoxycyclopentenyl diethyl thionophosphate*

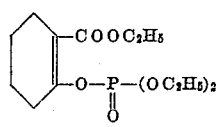

A suspension of 26.7 grams of the dry sodium salt of carbethoxycyclopentanone in 200 milliliters of anhydrous 4-methyl-2-pentanone was stirred at 50° C. while 28.5 grams of diethylchlorothionophosphate was added dropwise. The reaction mixture was then heated in an oil bath at 100° C. for two hours. After cooling, the sodium chloride was removed by two washings with 25 milliliters of water. The solvent was distilled in a vacuum and the oil residue was heated at 100° C. under a pressure of one millimeter of mercury to remove traces of volatile material. The yield was 44.5 grams (98 percent of the theory) of 1-carbethoxycyclopentenyl diethyl thionophosphate, an almost colorless oil.

P, percent
Calculated for $C_{12}H_{21}O_5SP$ _____ 10.05
Found _____ 9.90
9.99

EXAMPLE IV

*1-carbethoxycyclohexene-1-yl-2-diethyl phosphate*

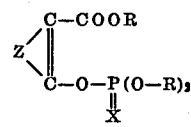

The sodium salt of carbethoxycyclohexane was prepared by the addition of the calculated amount of an aqueous sodium hydroxide solution to carbethoxycyclohexanone followed by separation of the salt from the water by suction and drying in a vacuum desiccator over phosphorus pentoxide. The dried salt (10.85 grams) was suspended in benzene and heated to 70° C. while 9.76 grams of diethylchlorophosphate was added. The mixture was refluxed for three hours and then cooled. The benzene solution was washed with water to remove sodium chloride and finally with saturated sodium bicarbonate solution. After drying the solution over sodium sulfate, the benzene was removed by vacuum distillation. The residue was 8.5 grams of 1-carbethoxy-cyclohexen-1-yl-2-diethyl phosphate, an almost colorless oil. The yield was 49 percent of the theory.

P, percent
Calculated for $C_{13}H_{23}O_5P$ _____ 10.55
Found _____ 11.19

Various modifications can be made in the procedure of the specific examples to provide other compounds which fall within the scope of our invention and which are useful insecticides. As has been stated above, the products of our invention can be prepared by reacting a dialkyl halophosphate, generally a chlorophosphate, and the alkali metal, usually sodium, salt of the enol form of a ketoester. Thus, in place of the diethylchlorophosphate and diethylchlorothionophosphate utilized in the specific examples, there can be substituted dimethylchlorophosphate, diisopropylchlorophosphate, di-n-butylchlorophosphate, di-isobutylchlorophosphate, diisoamylchlorophosphate, dimethylchlorothionophosphate, di-n-butylchlorothionophosphate and the like. Likewise, in place of the sodium salt of the enol form of carbethoxycyclopentanone and the sodium salt of the enol form of carbethoxycyclohexanone used in the examples, there can be substituted the sodium salts of the enol forms of carbmethoxycyclopentanone, carbmethoxycyclohexanone, carbisopropoxycyclopentanone, carbisopropoxycyclohexanone, carb-n-butoxycyclopentanone, carb-n-butoxy-cyclohexanone and the like.

We claim:

1. The compounds of the general formula:

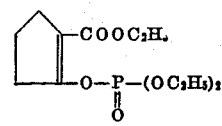

wherein X is selected from the group consisting of oxygen and sulfur, the R's are alkyl groups having from 1 to 5 carbon atoms and Z is selected from the group consisting of trimethylene and tetramethylene.

2. Carbethoxycyclopentenyl diethyl phosphate of the formula:

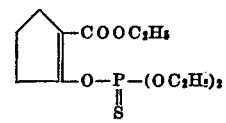

3. 1-carbethoxycyclopentenyl diethyl thionophosphate of the formula:

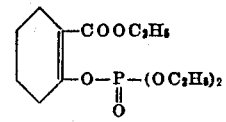

4. 1 - carbethoxycyclohexene - 1-yl-2-diethyl phosphate of the formula:

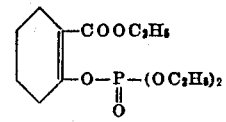

No references cited.